US006558588B2

(12) United States Patent
Shioiri et al.

(10) Patent No.: US 6,558,588 B2
(45) Date of Patent: May 6, 2003

(54) METHOD FOR CONTROLLING INJECTION MOLDING MACHINE

(75) Inventors: Takayoshi Shioiri, Nagano (JP); Masashi Suganuma, Nagano (JP); Hisato Shimizu, Nagano (JP); Yoshitoshi Yamagiwa, Nagano (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 5 days.

(21) Appl. No.: 09/906,707

(22) Filed: Jul. 18, 2001

(65) Prior Publication Data

US 2002/0008329 A1 Jan. 24, 2002

(30) Foreign Application Priority Data

Jul. 18, 2000 (JP) ........................................ 2000-21795

(51) Int. Cl.[7] ................................................ B29C 45/76
(52) U.S. Cl. ....................................... 264/40.1; 425/145
(58) Field of Search .......................... 264/40.1; 425/145

(56) References Cited

U.S. PATENT DOCUMENTS 6,042,760 A * 3/2000 Nakazawa et al. ......... 264/40.1

FOREIGN PATENT DOCUMENTS

JP 2627047 4/1997

* cited by examiner

*Primary Examiner*—Han H. Silbaugh
*Assistant Examiner*—Monica A Fontaine
(74) *Attorney, Agent, or Firm*—Birch, Stewart, Kolasch & Birch, LLP

(57) ABSTRACT

In a method for controlling an injection molding machine, a screw is advanced from an injection start position by means of velocity control, and when the screw reaches a control changeover point, pressure control is effected in place of the velocity control to apply pressure to the screw. Preliminary molding is performed to obtain an acceptable product; a total charged amount of resin during the preliminary mold is obtained on the basis of a movement distance over which the screw has moved before reaching the control changeover point during the preliminary mold; and the total charged amount is stored as a changeover target value. During ordinary molding, a total charged amount of resin is obtained on the basis of a movement distance over which the screw advances from the injection start position; and pressure control is started when the total charged amount reaches the changeover target value. Thus, the total amount of resin charged into a mold cavity in each molding cycle becomes constant without being affected by the charging pressure and temperature of the resin.

10 Claims, 6 Drawing Sheets

START
PRELIMINARY MOLDING — S1
ACCEPTABLE PRODUCT ? — S2
No
Yes
DETECT MOVEMENT AMOUNT OF SCREW — S3
DETECT CHARGING PRESSURE AND RESIN TEMPERATURE — S4
CALCULATE RESIN DENSITY →CALCULATE TOTAL CHARGED AMOUNT — S5
SET CALCULATED TOTAL CHARGED AMOUNT AS TARGET VALUE FOR V-P CHANGEOVER — S6
V-P CHANGEOVER CONTROL ON THE BASIS OF SET TARGET VALUE — S7
END

| SCREW POSITION X (mm) | CHARGING PRESSURE P (MPa) | RESIN DENSITY D (g/cm³) | MOVEMENT AMOUNT f (mm) | CHARGED AMOUNT q (g·mm/cm³) | TOTAL CHARGED AMOUNT Q (g·mm/cm³) |
|---|---|---|---|---|---|
| 40.000 | 0.000 | 0.000 | 0.000 | 0.000 | 0.000 |
| 39.000 | 4.500 | 0.725 | 1.000 | 0.725 | 0.725 |
| 38.000 | 8.500 | 0.730 | 1.000 | 0.730 | 1.455 |
| 37.000 | 12.500 | 0.746 | 1.000 | 0.746 | 2.201 |
| : | : | : | : | : | : |
| 11.000 | 63.000 | 0.813 | 1.000 | 0.813 | 22.808 |
| 10.047 | 63.500 | 0.813 | 0.953 | 0.775 | 23.583 |
| : | : | : | : | : | : |

METHOD FOR CONTROLLING INJECTION MOLDING MACHINE

BACKGROUND OF THE INVENTION

1. Field of the Invention

The present invention relates to a method for controlling an injection molding machine which is suitably used to switch the control mode from an injection mode for effecting velocity control to a pressure-holding mode for effecting pressure control.

2. Description of the Relevant Art

Generally, as shown in FIG. 7, a molding process (molding cycle) of an injection molding machine includes an injection step (velocity control region) in which measured resin is injected and charged into a cavity of a mold through advancement of a screw from an injection start position Xo under velocity control, and a pressure-holding step (pressure control region) which is started when the screw reaches a predetermined control changeover point and during which pressure is applied to the screw. Therefore, in a conventional injection molding machine as shown in, for example, Japanese Patent No. 2627047, the control or operation mode is switched from an injection mode to a pressure-holding mode in accordance with the position of the screw. That is, the position of the screw is monitored during the injection step, and when the screw reaches a preset V-P changeover position (control changeover point corresponding to Xc in FIG. 7), the control mode is switched to the pressure-holding mode. In FIG. 7, V represents injection velocity, Pi represents charging pressure, and Ph represents held pressure.

Accurate setting of the V-P changeover position is important for securing stable molding operation and obtaining molded products of high quality. In general, a V-P changeover position is set initially or temporarily on the basis of the volume of the mold cavity and other factors; and the initially set V-P changeover position is adjusted through repetition of trial injection (trial molding) and trial-and-error on the basis of the experience and so-called sixth sense of an operator. However, regardless of such careful adjustment of the V-P changeover position, obtaining molded products of high quality and a high level of homogeneity has been difficult, for the following reason. In the injection step in which velocity control is effected, the charging pressure Pi increases with progress of charging of resin; in particular, a sharp pressure increase occurs at the end of charging. Further, the charging pressure Pi at the end of charging varies sensitively with changes in the melting condition of resin that are attributable to temperature variation and other factors. Consequently, the amount of resin charged in the mold cavity varies, which makes it difficult to obtain molded products of high quality and a high level of homogeneity.

SUMMARY OF THE INVENTION

An object of the present invention is to provide a method for controlling an injection molding machine which enables resin to be charged into a mold cavity in a constant charged amount without being affected by disturbance factors, to thereby enable obtainment of molded products of high quality and a high level of homogeneity.

Another object of the present invention is to provide a method for controlling an injection molding machine, which method has a high degree of versatility and possibility of progress and can be applied to other types of control if necessary.

In order to achieve the above objects, the present invention provides a method for controlling an injection molding machine in which a screw is advanced from an injection start position by means of velocity control, and when the screw reaches a control changeover point, pressure control is effected in place of the velocity control to apply pressure to the screw, the method comprising the steps of: performing preliminary molding to obtain an acceptable product; obtaining a total charged amount of resin on the basis of a movement distance over which the screw has moved before reaching the control changeover point during the preliminary mold; storing the total charged amount as a changeover target value; obtaining, during ordinary molding, a total charged amount of resin on the basis of a movement distance over which the screw advances from the injection start position; and starting, during the ordinary molding, pressure control when the total charged amount reaches the changeover target value.

The method of the present invention guarantees that a total amount of resin charged into a mold cavity in each molding cycle becomes constant without being affected by the charging pressure and temperature of the resin.

The present invention further provides a method for controlling an injection molding machine in which a screw is advanced from an injection start position by means of velocity control, and when the screw reaches a control changeover point, pressure control is effected in place of the velocity control to apply pressure to the screw, the method comprising the steps of: performing preliminary molding to obtain an acceptable product; storing, as a reference movement distance, a movement distance over which the screw has moved before reaching the control changeover point during the preliminary mold; starting, during ordinary molding, pressure control when the screw advances over the reference movement distance; obtaining a total charged amount on the basis of the reference movement distance; and judging whether a molded product is acceptable or not, depending on whether the total charged amount falls within a preset allowable range.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known features is omitted.

Figure 8:
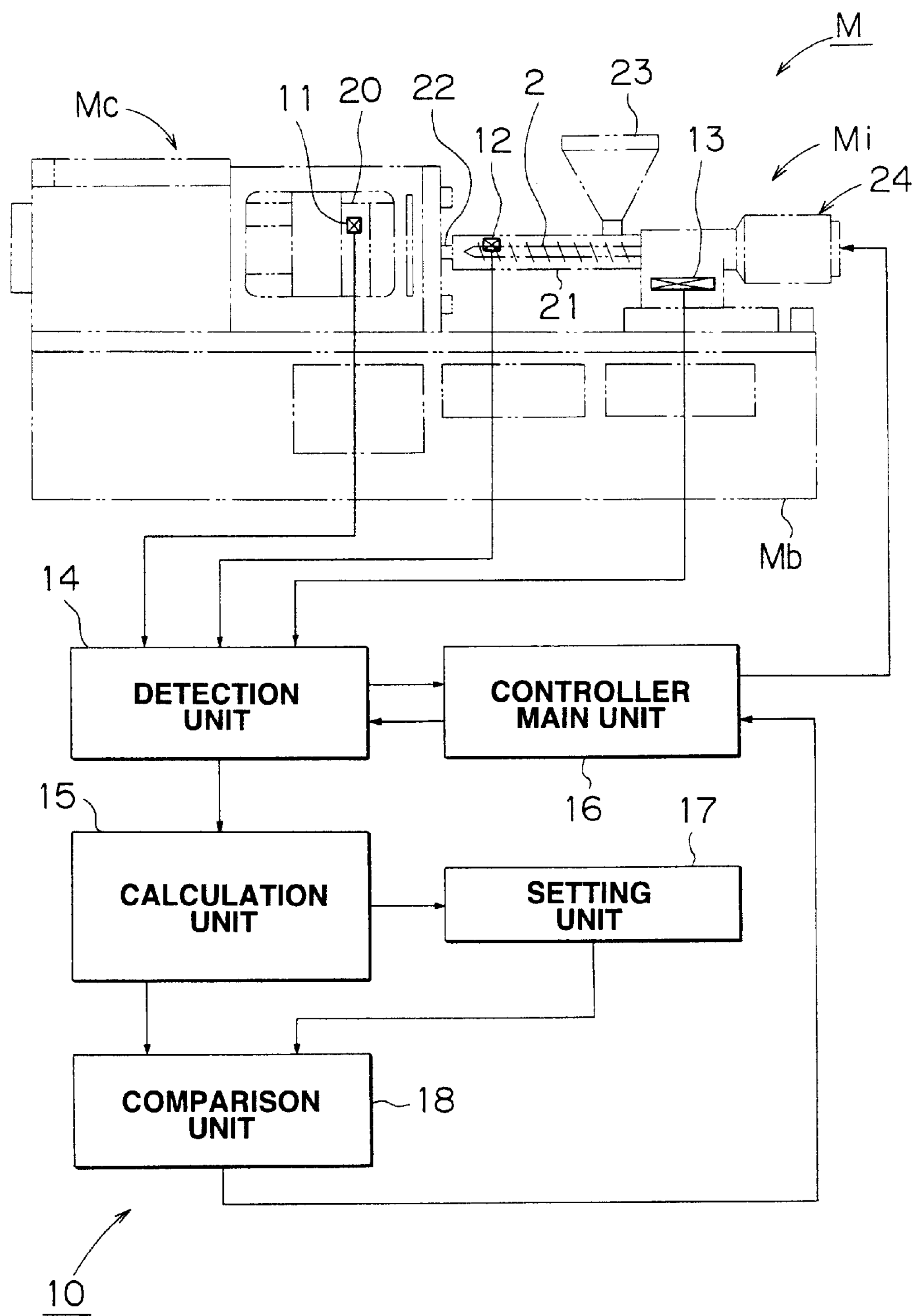
FIG. 8 is a diagram showing the configuration of an injection molding machine and its control system to which the control method of the present invention can be applied.

First, the configuration of an injection molding machine M to which a control method according to the present embodiment can be applied will be described with reference to FIG. 8.

The injection molding machine M includes a mold clamping apparatus Mc and an injection apparatus Mi disposed on a machine base Mb. The mold clamping apparatus Mc includes a mold 20. The injection apparatus Mi includes a heating barrel 21. An injection nozzle 22 for injecting and charging resin into the mold 20 is provided at the front end of the heating barrel 21, and a hopper 23 for supplying molding material to the heating barrel 21 is provided at a rear portion of the heating barrel 21. Further, a screw 2 is disposed within the heating barrel 21 to be rotated and reciprocated by a screw drive mechanism 24 disposed on the rear side of the heating barrel 21.

Meanwhile, reference numeral 10 denotes a control system for the injection molding machine M, which control system carries out the control method according to the present embodiment. Reference numeral 11 denotes a pressure sensor for detecting resin charging pressure P, which is attached to the mold 20. Reference numeral 12 denotes a temperature sensor for detecting resin temperature T, which is attached to the heating barrel 21. Reference numeral 13 denotes a position sensor for detecting position X (movement distance F) of the screw 2, which is attached to the injection apparatus M1. Signals output from these sensors 11, 12, and 13 are processed by a detection unit 14 and are fed to a calculation unit 15. Reference numeral 16 denotes a control main unit capable of exchanging signals (data) with the detection unit 14. Reference numeral 17 denotes a setting unit for storing data which are output from the calculation unit 15 and represent values obtained thereby. Reference numeral 18 denotes a comparison unit for comparing the data stored in the setting unit 17 and data output from the calculation unit 15. The comparison result is fed to the controller main unit 16. An output terminal of the controller main unit 16 is connected to the screw drive mechanism 24.

Figure 1:
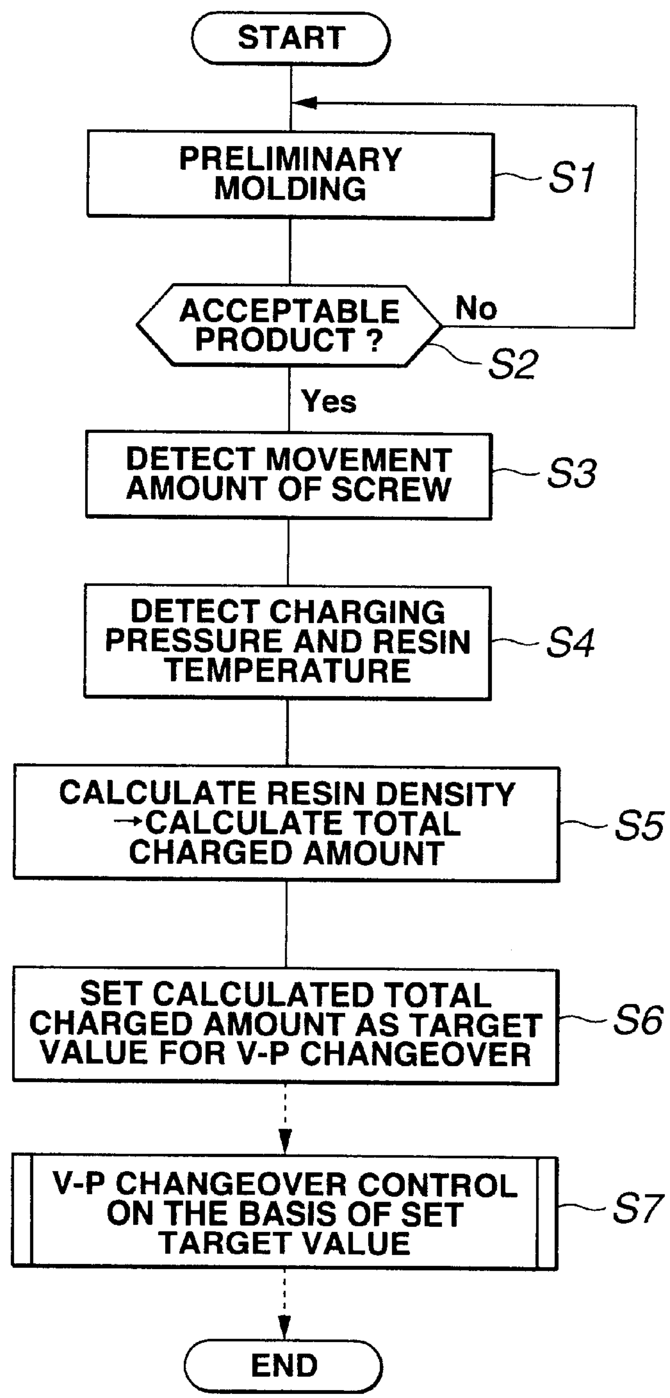
FIG. 1 is a flowchart showing a portion of processing performed on the basis of an injection-molding-machine control method according to an embodiment of the present invention.
Figure 2:
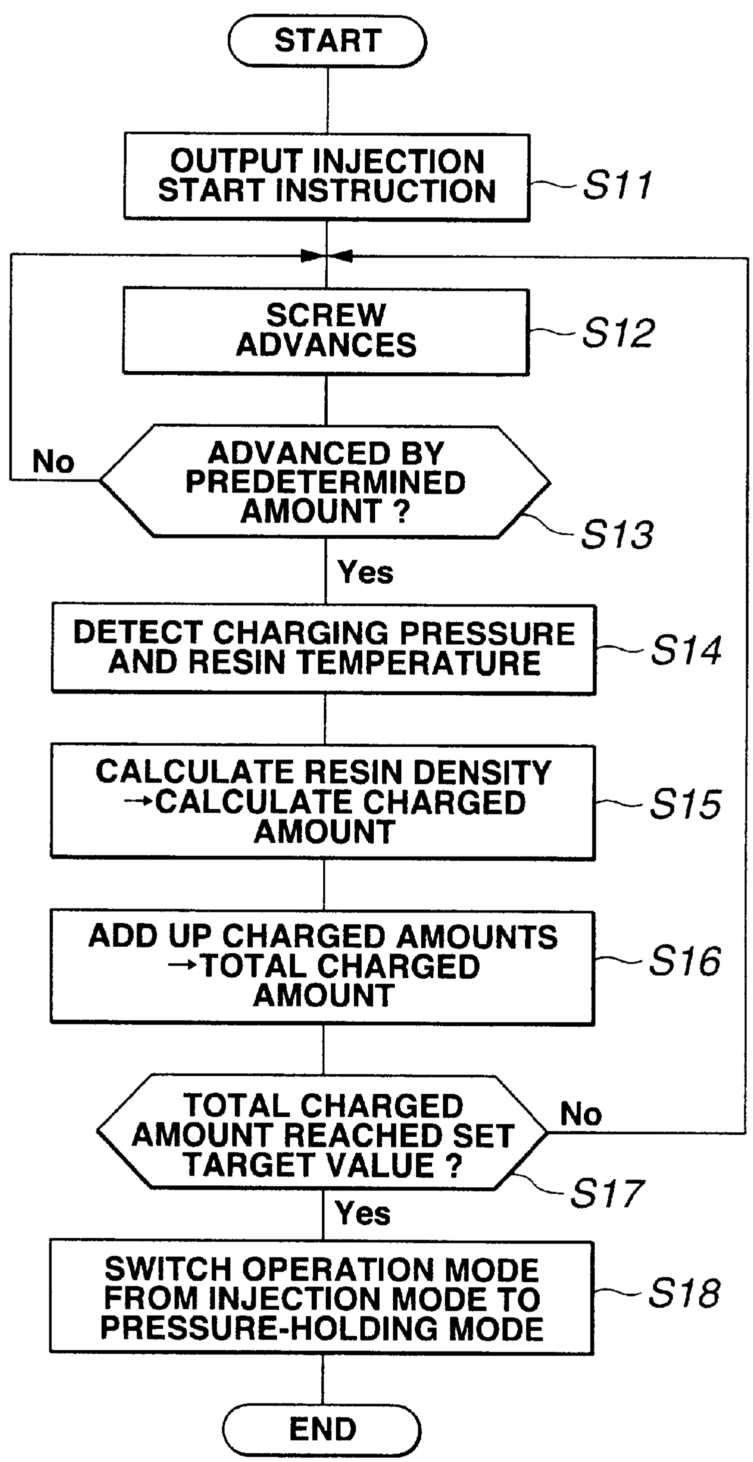
FIG. 2 is a flowchart showing another portion of the processing performed on the basis of the control method.
Figure 3:
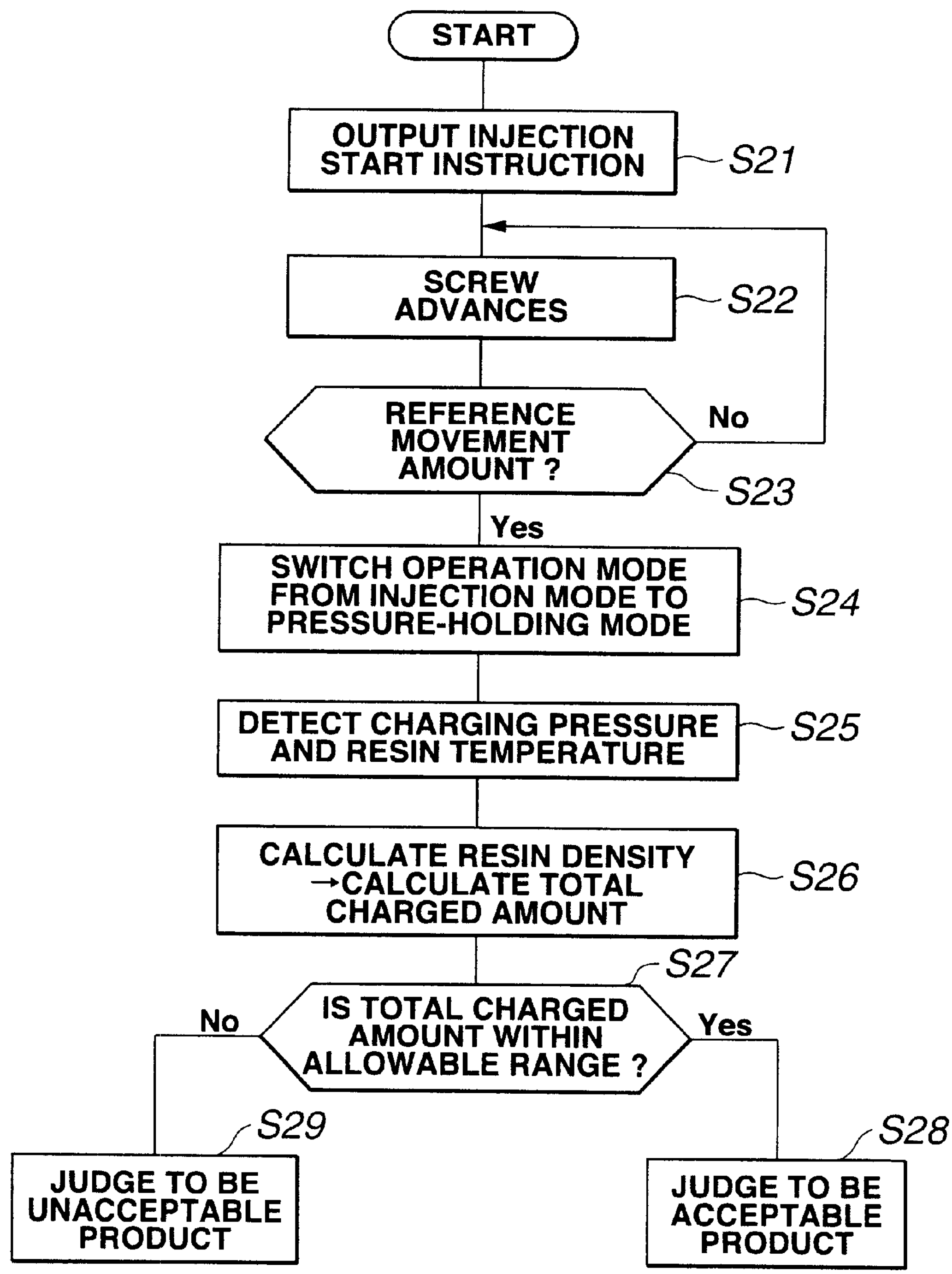
FIG. 3 is a flowchart showing a portion of processing performed on the basis of an injection-molding-machine control method according to another embodiment of the present invention.

Next, the control method according to the present embodiment will be described in accordance with flowcharts shown in FIGS. 1 to 3 and with reference to FIGS. 4 to 8.

In the present embodiment, a preliminary molding cycle is repeated until an acceptable product is obtained; a total charged amount Q of resin is obtained on the basis of a movement distance (reference movement distance) Fs over which the screw 2 has moved before reaching the control changeover point Xc in the preliminary molding cycle which yields the acceptable product; and the total charged amount Q is stored as a changeover target value Qs. First, a method for setting the changeover target value Qs will be described in accordance with the flowchart shown in FIG. 1.

First, the injection molding machine M is caused to perform preliminary molding (trial molding) (step S1). The trial molding is repeated until an acceptable product is obtained. When an acceptable product is obtained, a movement distance F (unit: mm) over which the screw 2 has moved before reaching the control changeover point Xc (FIG. 7) at which the control mode was switched from the injection mode to the pressure-holding mode is detected during the corresponding cycle, and is fed to the calculation unit 15 (steps S2 and S3). The movement distance F at that time is used as a reference movement distance Fs.

Figure 4:
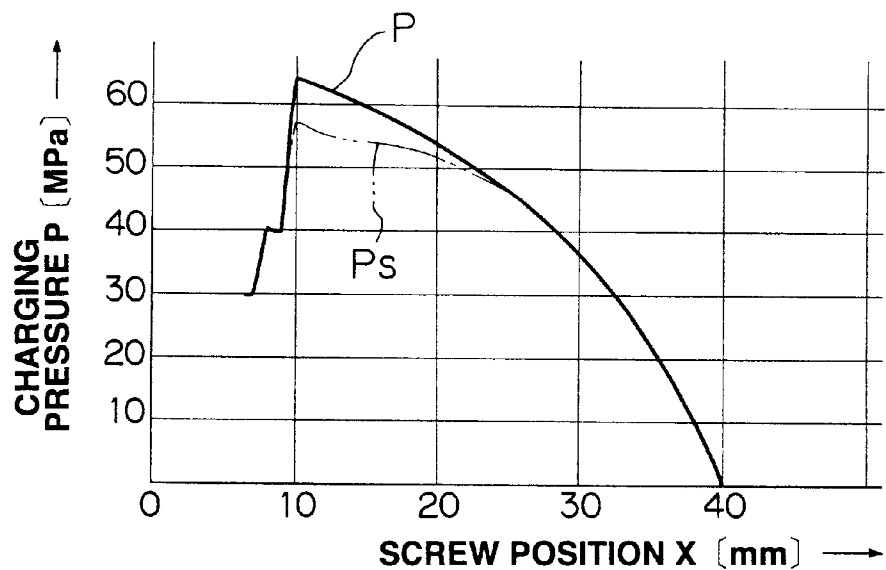
FIG. 4 is a characteristic diagram showing the relation between screw position and charging pressure.

Further, the charging pressure P (unit: MPa) and the resin temperature T (unit: ° C.) at the time of the acceptable product being obtained are detected by the pressure sensor 11 and the temperature sensor 12, respectively, and fed to the calculation unit 15 (step S4). FIG. 4 shows the relation between position X of the screw 2 and actual charging pressure P. In FIG. 4, reference character Ps represents a reference charging pressure, and in the example shown in FIG. 4, the charging pressure P is slightly higher than the reference charging pressure Ps.

Meanwhile, the calculation unit 15 calculates the total charged amount Q (unit: g·mm/cm$^3$) of resin on the basis of the reference movement distance Fs, the charging pressure P, and the resin temperature T (step S5). Specifically, the total charged amount Q can be obtained by the following expression:

$$Q=A\cdot Fs\cdot D \tag{1}$$

where A represents cross-sectional area of the screw 2 (unit: m$^2$), and D represents resin density (unit: g/cm$^3$).

The resin density D is obtained by the following expression:

$$D=a\cdot P^2+b\cdot P+c \tag{2}$$

where a, b, and c are coefficients which vary with resin temperature T and can be obtained by the following expressions:

$$a=d_1\cdot T+e_1, \tag{3}$$

$$b=d_2\cdot T+e_2,\ \text{and} \tag{4}$$

$$c=d_3\cdot T+e_3. \tag{5}$$

Figure 5:
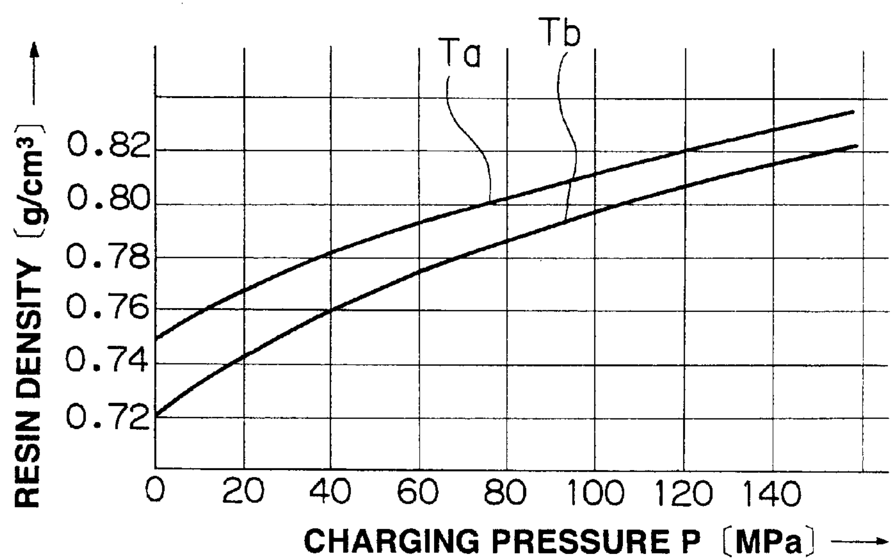
FIG. 5 is a characteristic diagram showing the relation between charging pressure and resin density.

FIG. 5 shows the relation between the charging pressure P and the resin density D for the case in which polypropylene is used as molding material. In FIG. 5, curve Ta shows the relation for the case of the resin temperature being 231° C., and curve Tb shows the relation for the case of the resin temperature being 187° C. Since the resin density D varies with the resin temperature T as described above, the above-described expressions (3) to (5) serve as conversion expressions for changing the respective coefficients a, b, and c in accordance with the resin temperature T. Notably, in general, the characteristics shown in FIG. 5 are provided from a material manufacturer; and the respective coefficients $d_1$, $d_2$, $d_3$, $e_1$, $e_2$, and $e_3$ can be obtained from the characteristics shown in FIG. 5 by use of equations.

Figures 6, 7:
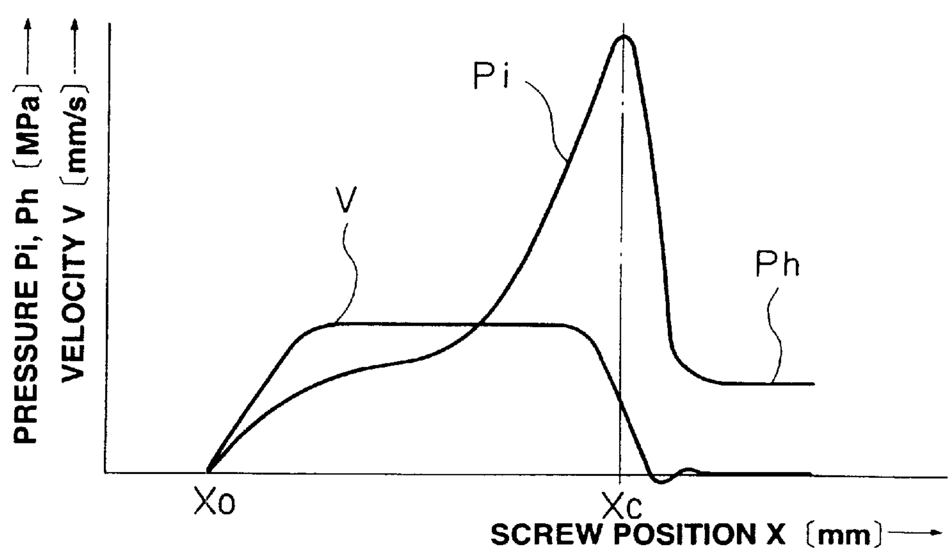
FIG. 6 is a table showing detected values and calculated values used in the injection-molding-machine control method according to the embodiment of the present invention.
FIG. 7 is a characteristic diagram showing changes in injection velocity, charging pressure, and held pressure with screw position.

FIG. 6 shows actually detected values and calculated values. In FIG. 6, 10.047 mm in the column of screw position X represents a position of the screw 2 at which an acceptable product was obtained. The charging pressure P detected at that time is 63.500 MPa. Meanwhile, since the coefficients a, b, and c can be obtained from the resin temperature T detected at that time and the above-described expressions (3) to (5), the resin density D can be obtained from expression (2), and the total charged amount Q can be obtained from expression (1). The total charged amount Q obtained from expression (1) is stored in the setting unit 17 as the changeover target value Qs (step S6).

Subsequently, ordinary molding cycles are performed. In each ordinary molding cycle, the control changeover; i.e., switching the control mode from the injection mode to the pressure-holding mode, is performed by use of the changeover target value Qs (step S7).

Next, a method for switching the control mode from the injection mode to the pressure-holding mode will be described in accordance with the flowchart shown in FIG. 2.

Here, we assume a state in which a metering step has been completed in an ordinary molding cycle. After completion of the metering step, the injection step is started. In the injection step, the controller main unit 16 outputs an injection start instruction (step S11). In response thereto, the screw drive mechanism 24 is controlled in order to advance the screw 2 (step S12). At this time, the screw 2 is advanced by means of velocity control. That is, as shown in FIG. 7, the screw 2 is controlled in such a manner that the screw 2 advances from the injection start position Xo at a preset constant velocity V.

Meanwhile, the controller main unit 16 monitors the position X (movement distance) of the screw 2. When the screw 2 advances a predetermined distance f (1.000 mm in the present embodiment), the calculation unit 15 calculates a charged amount q corresponding to the predetermined distance f (step S13). Specifically, after movement over the predetermined distance f, the calculation unit 15 inputs the charging pressure P and the resin temperature T and calculates the charged amount q by use of the above-described expressions (1) to (5) (steps S14 and S15). Such calculation of the charged amount q is performed every time the screw 2 advances the predetermined movement distance f; and the thus-obtained charged amounts q are successively totaled (step S16). In this manner, the total charged amount Q can be obtained periodically during the course of advancement of the screw 2.

The total charged amount Q periodically obtained is fed to the comparison unit 18. The comparison unit 18 compares the total charged amount Q and the changeover target value Qs stored in the setting unit 17 (step S17). When the total charged amount Q has reached the changeover target value Qs, the control mode is switched from the injection mode to the pressure-holding mode in order effect pressure control (step S18). Xc in FIG. 7 represents the control changeover point at that time. Thus is started an injection step in which constant pressure Ph is applied to the screw 2.

As described above, in the method for controlling the injection molding machine M according to the present embodiment, a preliminary molding cycle is repeated until an acceptable product is obtained; a total charged amount Q of resin is obtained on the basis of a reference movement distance Fs over which the screw 2 has moved before reaching the control changeover point Xc in the preliminary molding cycle which yields the acceptable product; the total charged amount Q is stored as a changeover target value Qs; in each ordinary molding cycle, the total charged amount Q of resin is obtained on the basis of a movement distance over which the screw 2 advances from the injection start position Xo; and pressure control is started in place of the velocity control when the total charged amount Q reaches the changeover target value Qs. Therefore, the amount of resin charged into the mold cavity in each molding cycle becomes constant. In other words, even when the resin density D (which is dependent on the resin temperature T and the charging pressure P) varies, a constant charged amount can be secured at all times without being affected by such disturbance factors, so that molded products of high quality and a high level of homogeneity can be obtained.

The control method according to the present embodiment can be used to judge whether a molded product is acceptable. FIG. 3 shows a flowchart for performing such judgment.

Upon completion of a metering step, the controller main unit 16 outputs an injection start instruction in order to start an injection step (step S21). In response thereto, the screw drive mechanism 24 is controlled in order to advance the screw 2 (step S22).

Meanwhile, the controller main unit 16 monitors the position X (movement distance) of the screw 2. When the screw 2 has advanced the reference movement distance Fs obtained during the preliminary molding, the control mode is switched to the pressure-holding mode in order to effect pressure control (steps S23 and S24). Simultaneously, the calculation unit 15 calculates a total charged amount Q at that time, by use of the above-described expressions (1) to (5) (steps S25 and S26). The total charged amount Q is fed to the comparison unit 18, which judges whether the total charged amount Q falls within an allowable range (step S27). When the total charged amount Q falls within the allowable range, a molded product is judged to be acceptable (step S28). When the total charged amount Q deviates from the allowable range, the molded product is judged to be unacceptable (step S29). As described above, the control method according to the present invention can be applied to other types of control if necessary, and therefore has a high degree of versatility and possibility of progress.

While the present invention has been described with reference to the preferred embodiment, the present invention is not limited thereto. Regarding structural details, shape, technique, among others, modifications and any omission or addition may be possible as needed without departing from the scope of the invention. For example, the above embodiment exemplifies a case in which the charging pressure P of resin is detected by means of the pressure sensor 11 attached to the mold 20. However, the charging pressure P of resin may be detected from resin pressure within the heating barrel 21 or the injection nozzle 22, injection pressure, or torque of an injection motor. Further, the above embodiment exemplifies a case in which the resin temperature T is detected by means of the temperature sensor 12 attached to the heating barrel 21. However, the resin temperature T may be detected directly from the temperature of resin, or indirectly from the temperature of the heating barrel 21 (injection nozzle 22). In the embodiment, an inline-screw-type injection molding machine is exemplified. However, the present invention can be applied to other types of injection molding machines, such as a preplasticization-type injection molding machine. Further, an example case in which various values are obtained through calculation is shown. However, those values may be obtained from a preset data table, and therefore, the term "obtain" encompasses the case in which such a data table is used.

What is claimed is:

1. A method for controlling an injection molding machine in which a screw is advanced from an injection start position by means of velocity control, and when the screw reaches a control changeover point, pressure control is effected in place of the velocity control to apply pressure to the screw, the method comprising the steps of:

performing preliminary molding to obtain an acceptable product;

obtaining a total charged amount of resin on the basis of a movement distance over which the screw has moved before reaching the control changeover point during the preliminary molding;

storing the total charged amount as a changeover target value;

obtaining, during ordinary molding, a total charged amount of resin on the basis of a movement distance over which the screw advances from the injection start position; and starting, during the ordinary molding, pressure control when the total charged amount reaches the changeover target value.

2. A method for controlling an injection molding machine according to claim 1, wherein the step for performing preliminary molding includes repeatedly performing trial molding until an acceptable product is obtained.

3. A method for controlling an injection molding machine according to claim 1, wherein the total charged amount is obtained on the basis of a density of resin, a movement distance of the screw, and a cross sectional area of the screw.

4. A method for controlling an injection molding machine according to claim 3, wherein the density of resin is obtained on the basis of a charging pressure of the resin, a temperature of the resin, and a coefficient.

5. A method for controlling an injection molding machine according to claim 1, wherein the total charged amount during the ordinary molding is obtained through obtaining a charged amount every time the screw moves a predetermined distance and adding up the obtained charged amount.

6. A method for controlling an injection molding machine in which a screw is advanced from an injection start position by means of velocity control, and when the screw reaches a control changeover point, pressure control is effected in place of the velocity control to apply pressure to the screw, the method comprising the steps of:

performing preliminary molding to obtain an acceptable product;

storing, as a reference movement distance, a movement distance over which the screw has moved before reaching the control changeover point during the preliminary molding;

starting, during ordinary molding, pressure control when the screw advances over the reference movement distance;

obtaining a total charged amount on the basis of the reference movement distance; and judging whether a molded product is acceptable or not, depending on whether the total charged amount falls within a preset allowable range.

7. A method for controlling an injection molding machine according to claim 6, wherein the step for performing preliminary molding includes repeatedly performing trial molding until an acceptable product is obtained.

8. A method for controlling an injection molding machine according to claim 6, wherein the total charged amount is obtained on the basis of a density of resin, a movement distance of the screw, and a cross sectional area of the screw.

9. A method for controlling an injection molding machine according to claim 8, wherein the density of resin is obtained on the basis of a charging pressure of the resin, a temperature of the resin, and a coefficient.

10. A method for controlling an injection molding machine according to claim 6, wherein the total charged amount during the ordinary molding is obtained through obtaining a charged amount every time the screw moves a predetermined distance and adding up the obtained charged amount.

* * * * *